Dec. 18, 1923.  
P. E. FELLOWS  
CONNECTING LINK  
Original Filed March 23, 1922
1,478,003
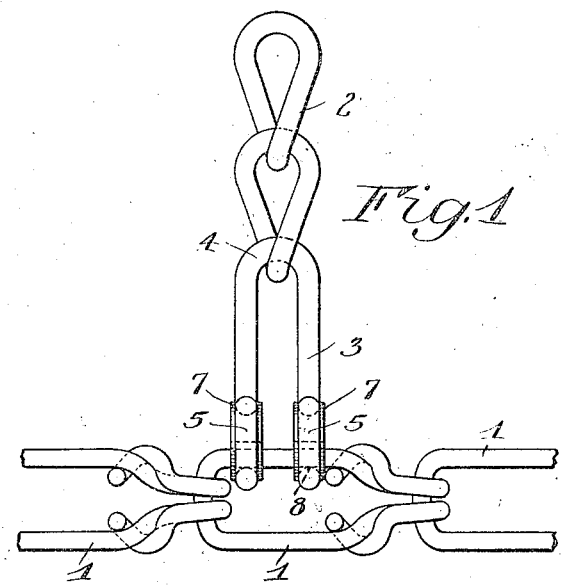
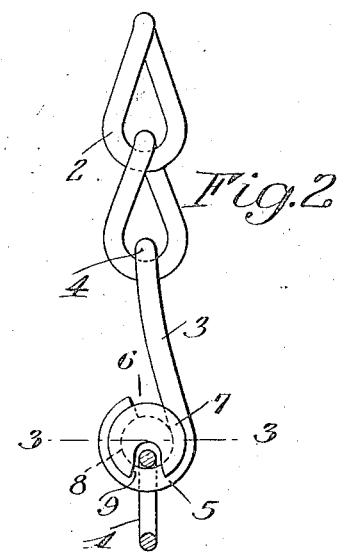
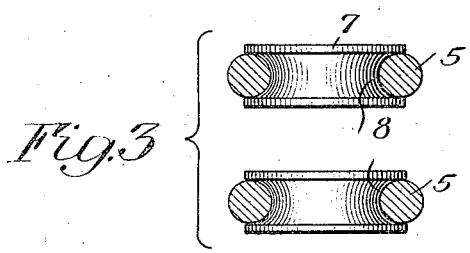
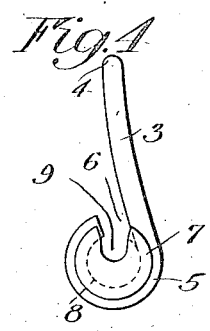
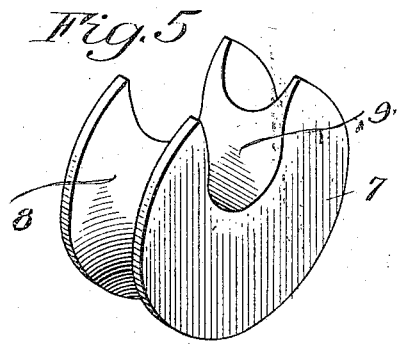
INVENTOR.  
Perry E. Fellows  
BY  
his ATTORNEY Patented Dec. 18, 1923.

1,478,003

UNITED STATES PATENT OFFICE.

PERRY E. FELLOWS, OF ROCHESTER, NEW YORK.

CONNECTING LINK.

Application filed March 23, 1922, Serial No. 545,995. Renewed October 13, 1923.

*To all whom it may concern:*

Be it known that I, PERRY E. FELLOWS, of Rochester, in the county of Monroe and State of New York, have invented certain new and useful Improvements in Connecting Links; and I do hereby declare the following to be a full, clear, and exact description of the same, reference being had to the accompanying drawing, forming a part of this specification, and to the reference numerals marked thereon.

My present invention relates to chains and more particularly to connecting links therefor, and it has for its object to provide a simple, cheap and serviceable link of this character that can be readily applied or detached to couple up two lengths of chain. A further object of the invention is to provide a link that is locked in a simple manner when attached and one particularly applicable for use with the anti-skid chains of automobile wheels, the device being so constructed as not to be easily impaired by the action of rust and dirt. To these and other ends the invention consists in certain improvements and combinations of parts, all as will be hereinafter more fully described, the novel features being pointed out in the claim at the end of the specification.

In the drawings:

Figure 1 is a front view of a connecting link constructed in accordance with and illustrating one embodiment of my invention, the same being shown applied to fragments of an anti-skid chain;

Figure 2 is a side view of the connecting link taken in section through a connected link;

Figure 3 is a section on the line 3—3 of Figure 2;

Figure 4 is a side view of my connecting link in open position, it being shown in closed or locked position in Figure 2. and Figure 5 is a perspective view of the locking disk.

Similar reference numerals throughout the several views indicate the same parts.

I have illustrated my invention in the present embodiment in connection with a familiar type of tire chain equipment embodying side chains 1 that run circularly about the wheel at the side of the car and cross chains 2 that run transversely across the tread of the tire and are attached at their ends at right angles to the side chains. The function of my device is to effect this attachment in a manner permitting the cross chains to be readily attached when renewals thereof are required which renewals are frequent as the cross chains are subject to wear.

The links of the cross chain 2, only a fragment of which is shown, are usually twisted links of the form disclosed by a comparison of Figures 1 and 2 and the side chains 1 are composed of rectangular wire links having elongated side portions. My device comprises a yoke shaped member 3 of round wire having a loop 4 at one end that is passed through and connects with one of the cross chain links 2 so as to lie flat against the side of the tire. The two parallel arms of the yoke are bent into alined eyes 5 at their ends which eyes are only partially closed though otherwise circular leaving opening 6. There is retained in each eye against bodily movement though rotatable on its own axis a disk 7 provided with a circumferential groove 8 that fits the interior conformation of the eye and is adapted to turn freely therein, the eye being in fact bent or formed about the disk so that it forms a loose bearing for the latter. There is also formed in the periphery of the disk a recess 9 that is preferably cut inwardly substantially radially to a point at or near its center and this disk may in each instance be rotated to a position in which the recess 9 registers with the opening 6 in the eye as in Figure 4 or to a position in which the disk closes the opening 6, the recess 9 being on the opposite side of the eye as shown in Figure 2.

When it is desired to connect up the links 1 the disks 7 are rotated to the position of Figure 4 and the link 1 passed through the opening 6 and into the recess 9. The link 1 is then drawn around the circumference of the eye, the disks 7 moving with it until they reach the position of Figure 2 and the link 1 is fully engaged in the eyes.

This makes a connecting link that is very readily attached and once the disks are locked there is little liability of their opening again to release the link 1 particularly as there are two of them. The disks may be made to turn so loosely in the eyes that neither rust nor mud will jam them and yet be sufficiently confined to prevent their disengagement or a substantial movement other than their movement of rotation.

I claim as my invention:

The combination with a connecting link for chains having a circular eye at one end provided with an opening through which an adjacent link is adapted to be engaged, of a locking disk retained against bodily movement in the eye but adapted to rotate on its own axis and provided with a radial recess in its periphery terminating short of the center of the desk and adapted to register with the opening in the eye and to rotate with the engaged link to a position out of such register.

PERRY E. FELLOWS.